US007034935B1

(12) United States Patent
Kruzelecky (10) Patent No.: US 7,034,935 B1
(45) Date of Patent: Apr. 25, 2006

(54) HIGH PERFORMANCE MINIATURE SPECTROMETER

(75) Inventor: Roman V. Kruzelecky, Beaconsfield (CA)

(73) Assignee: MPB Technologies Inc., Pointe-Claire (CA)

( * ) Notice: Subject to any disclaimer, the term of this patent is extended or adjusted under 35 U.S.C. 154(b) by 297 days.

(21) Appl. No.: 10/394,662

(22) Filed: Mar. 24, 2003

(51) Int. Cl.
*G01J 3/28* (2006.01)

(52) U.S. Cl. .......................... 356/328; 385/31; 385/37; 250/339.02

(58) Field of Classification Search ........ 356/326–330; 385/12–13, 24, 31, 37; 250/339.02
See application file for complete search history.

(56) References Cited

U.S. PATENT DOCUMENTS 3,756,688 A * 9/1973 Hudson et al. ............... 385/43
4,784,935 A * 11/1988 Ehrfeld et al. ............... 356/328
4,999,489 A * 3/1991 Huggins ................. 250/237 G
5,812,262 A * 9/1998 Ridyard et al. ............. 356/328
6,303,934 B1 * 10/2001 Daly et al. ............. 250/339.02
6,657,723 B1 * 12/2003 Cohen et al. ................ 356/328
6,753,958 B1 * 6/2004 Berolo et al. ................ 356/328
6,795,182 B1 * 9/2004 Rakuljic et al. ............. 356/328
2003/0048498 A1 * 3/2003 Pearson et al. .............. 359/110

OTHER PUBLICATIONS

Development of a Miniaturized Integrated Optical Spectrometer for the Infrared Spectral Range, MPB Technologies Inc. and Institut National d'Optique, SPIE vol. 2744, pp. 684–695.

* cited by examiner

*Primary Examiner*—Layla G. Lauchman
(74) *Attorney, Agent, or Firm*—Bereskin & Parr (57) ABSTRACT

An infrared spectrometer is described wherein a detector array is optically coupled to a slab waveguide structure. A focal plane is provided outside of the output face of the slab waveguide structure and the detector array is mounted onto the slab waveguide structure at a fixed distance from the output face on the output focal plane.

39 Claims, 6 Drawing Sheets

HIGH PERFORMANCE MINIATURE SPECTROMETER

FIELD OF THE INVENTION

The invention relates to optical spectroscopy. More specifically, it relates to an apparatus for performing infrared spectroscopy.

BACKGROUND OF THE INVENTION

Optical spectroscopy can provide quantitative information about the chemical composition and bonding configuration of molecular structures. Most molecules that comprise solid, liquid or gaseous samples have characteristic vibrational modes associated with their chemical bonds that can interact with photons. This results in optical absorption bands, mainly in the infrared spectral range, that are indicative not only of the chemical bond but also of the actual bonding configuration (i.e. $X-Y_n$) and the local chemical environment. Non-contact infrared (IR) spectral reflectance or transmittance measurements probe these characteristic molecular vibrational modes of a sample to provide valuable information about the chemical bonding and composition in solids, liquids and gases.

Infrared spectroscopy, therefore, can yield more information than other methods which merely provide data about the relative content of X and Y in a sample. This methodology has been widely employed in laboratories using relatively large, bulk-optic dispersive NIR spectrometers and Fourier Transform Infrared (FT-IR) spectrometers as a diagnostic tool for the characterization of suitable samples and to assist process development for the synthesis and/or modification of materials. The table-top dispersive spectrometers generally consist of a free space arrangement of input optics, an input slit, mirrors to fold the optical path, a reflecting replicated grating, output optics, an output slit or detector array. For spectrographs using a single detector, additional scan motors are employed to vary the output wavelength impinging on the photo detector. FT-IR instruments employ an optical interferometer with a moving mirror in one arm of the interferometer to provide a spatial transform of the desired signal spectrum. This requires precise positioning of the movable mirror that entails an additional reference laser. Since the spectral information is not measured directly by the FT-IR instrument; substantial additional data processing is required to estimate the desired spectral information using mathematical transform techniques. The free space infrared spectrometers are sensitive to effects due to the ambient medium, such as optical absorption by water vapor. As a result, FT-IR and infrared dispersive spectrometers are generally purged using a supply of dry $N_2$. The alignment of the free space optics is sensitive to temperature fluctuations and mechanical vibrations. This often requires additional costly environmental controls (i.e. temperature control, vibration damping) that add to the net system size and power consumption to assure the spectrometer performance.

There is a myriad of applications for IR spectroscopy in non-ideal conditions outside the laboratory that require performance characteristics comparable to a table-top FT-IR but in a more environmentally robust instrument with reduced size and mass for portability. Potential applications include, but are not limited to, the detection of biohazards in the working environment, blood analysis, analysis of soil samples and mineralogy by diffuse reflectance spectroscopy, monitoring of water and air quality, and the analysis of pharmaceutical powders and liquids. Many of these applications, including diffuse reflection measurements and biohazard detection, require a substantial system signal-to-noise ratio (SNR) to facilitate satisfactory resolution of the desired signal. For biohazard detection, detectivities in the ppm to ppb range are desirable, requiring very high SNR for a spectrograph system to be viable. For general diffuse reflection measurements, the return signal from an optically scattering target can be less than 5% of the incident illumination signal, yet a minimum SNR exceeding 1000 is desired for the spectral characterization of the diffusely reflected signal. Moreover, very intense illumination sources are undesirable as they can damage or alter the sample under investigation. Therefore, it is desirable to have a portable, lightweight infrared spectrometer capable of performance comparable to table-top dispersive or FT-IR instruments, but with improved tolerance to environmental perturbations.

There are several optical spectrometers in the prior art that attempt to remedy the problems of spectrometer size, weight, complexity and power consumption. Examples include Zeiss' Monolithic Miniature Spectrometer, or MMS 1 that is distributed by Hellma International Inc. The MMS 1 consists of a bulk silica cylinder with an integral reflecting imaging grating at the rear end of the cylinder. The input front face of the silica cylinder is coupled to a linear fiber array at the front input end and a silicon photodiode at the front output end. The use of silica limits the spectral range to the visible and NIR. Current spectral bandwidths in the NIR for the MMS spectrograph are limited to about 1 to 2.2 µm. The spectrometer design requires considerable bulk optical-quality glass that would be relatively expensive to duplicate in the infrared using typical IR transmissive materials such as ZnSe or Si. This would be further compounded if a broader spectral operating range in the infrared was required, since this would entail a much larger glass cylinder.

The LIGA-technique, involving X-ray lithography, electroforming and molding, has also been employed to fabricate miniature spectrometers for the VIS and NIR by Kernforschungszentrum Karslruhe GmbH, as represented by American Laubscher Corp. in the U.S. In the LIGA process, a X-ray sensitive polymer resist sheet, of the desired thickness of the waveguide core, is bonded onto glass or Si. A Ti mask is used to pattern the resist under exposure to X-ray synchrotron radiation. The exposed resist is removed by chemical stripping. This is employed to produce a molding insert. The mold can then be used to produce many copies by hot embossing. For the NIR, the spectrometer waveguide consists of an air gap between two plates containing vapor-deposited Au. This can provide attenuation below 0.3 dB/cm in waveguides exceeding 0.5 mm in thickness for an input NA=0.22. The loss is due to scattering and the finite reflectivity at the air/Au interface.

A resolution of about 10 nm was obtained over a 400 nm bandwidth in the LIGA NIR spectrometer near 1.6 µm. Extraneous stray light and noise is about 5% of the peak transmittance of the LIGA spectrometer, limiting its application to high signal applications. The typical waveguide core height is about 150 µm. Core heights up to 500 µm are possible, although there can be some degradation of the accuracy, verticality and smoothness of the grating elements. This limits the attainable optical luminosity of the LIGA spectrometer for low signal detectivity.

The theory and use of optical waveguides to provide optical confinement is well known and has been described in text books as early as the 1960's. In general, an optical slab waveguide consists of a sandwich structure of three basic layers; an upper cladding, an intermediate core layer, and a lower cladding. The main requirements for optical guiding are that the core layer be transmissive to the desired optical signal and that the refractive index of the core layer be larger than that of the upper and lower cladding layers. While the basic theory of optical waveguides is well documented, specific waveguide structures (core/cladding) with improved characteristics for a desired application could be the subject of new inventions. Various optically transmissive materials for the infrared spectral range are well known and documented, including Si, Ge, ZnSe, ZnS and sapphire.

Optical slab waveguides offer an important cost advantage over the use of bulk IR transmissive materials for the realization of integrated infrared spectrometers since the vertical optical confinement provided by the waveguide structure substantially reduces the amount of typically expensive IR material that is required to fabricate the spectrometer.

A miniature infrared spectrometer based on a slab waveguide structure employing a semi-insulating Si core and using the Rowland optical-layout geometry was reported in SPIE Proceedings of Infrared Technology and Applications XXII (vol. 2744, p. 684, 1996) in 1996 by the applicant. The main problem with this prior design was inefficient coupling of the optical output to linear detector arrays due to the curvature of the focal plane in the Rowland geometry.

Figure 1:
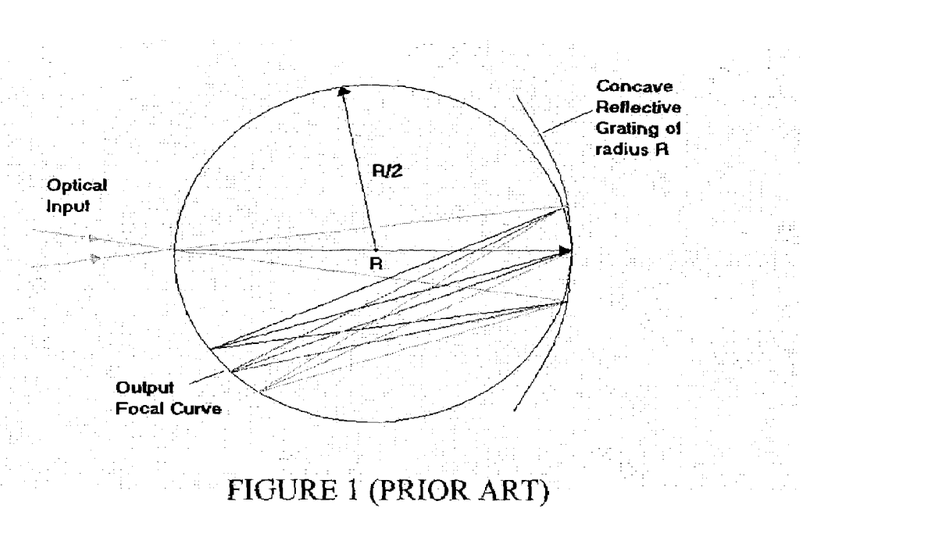
FIG. 1 is a schematic of Rowland optical layout for spectrometers.

The layout of most miniature spectrometers is based on a version of the Rowland geometry, as shown in FIG. 1. This concept employs a concave grating of radius R that minimizes the number of optical components required. In the classic Rowland geometry, the output focal plane lies along the Rowland circle of radius R/2. This is not suitable for coupling to a linear detector array.

More recently, James T. Daly, et. al (U.S. Pat. No. 6,303,934 B1) describe a miniature spectrometer based on a Si slab waveguide that consists of a flat front face containing an optical input portion, a diffraction portion with a machined chirped optical grating, and an exit portion with faces that are perpendicular to the plane of the slab waveguide. The rear portion of the slab waveguide contains a concave mirror. The spectrometer layout is based on the conventional and well known Ebert and Czerny-Turner, using an additional mirror to fold the optical path and reduce the length of the spectrometer at the expense of an increased width. This results in a relatively complex optical path that is sensitive to any non-idealities in the manufacturing process for a slab waveguide spectrometer.

The prior art slab waveguide spectrometer (U.S. Pat. No. 6,303,934 B1) employs a bare Si slab waveguide core with the surrounding medium or ambient acting as the upper and lower cladding. This is very disadvantageous for high-performance spectrometer operation for two main reasons. Firstly, stray ambient light can couple into the spectrometer through the air/core interface and contribute to the background signal. Secondly, without upper and lower cladding layers, the waveguide functions as a evanescent wave transmission cell. The optical signal within the Si slab penetrates slightly into the surrounding medium as it reflects from the air/Si interface. The optical signal thus interacts with the surrounding medium and can be absorbed by any condensates at the air/Si interface and infrared absorbing species within the surrounding medium. This is the basis of evanescent wave spectroscopy. Optical absorption by water vapor in the surrounding medium and condensation on the surface of the bare Si core can be particularly problematic due to the strong infrared absorption peaks. These factors can significantly obscure the spectral measurement of the desired optical signal.

The previous remedy (U.S. Pat. No. 6,303,934 B1) employs a special chirped grating to provide an approximately linear output focal plane at the output face of the slab waveguide. This is micro-machined onto the flat diffraction portion of the waveguide. Chirped gratings entail a grating period that varies along the width of the grating according to a prescribed formula. The concepts are well documented and well known to those skilled in the art. However, the variation in the grating period between adjacent gating elements can be quite small and comparable to the precision available to perform the micromachining. Therefore, the manufacturing of chirp gratings is complex and can be significantly more expensive than uniform gratings with a constant grating period.

Therefore, while some of the spectrometers in the prior art have attempted to remedy the problems of size, weight and complexity relative to typical laboratory grade infrared spectrographs and Fourier Transform Infrared (FT-IR) instruments, they do not provide a solution to the additional requirements of the spectrometer performance and signal detectivity relative to the laboratory grade instruments. This is especially critical for the miniature spectrometers to provide a viable solution in the infrared spectral range, spanning from 1.5 to beyond 12 µm, since the detectivity of typical uncooled infrared detectors such as PbSe or HgCdTe is several orders of magnitude less than that of Si visible detectors and InGaAs NIR detectors. In many of the applications where a compact, lightweight portable spectrometer system is highly desirable, such as biohazard detection, geological surveys of minerals in rock samples, analysis of contaminants in soil, water and air samples, and hyper-spectral planetary surveys for space exploration, the detectivity and SNR of the spectrometer system is of prime concern.

None of these prior art spectrometers permit fully monolithic operation with high SNR, low sensitivity to ambient conditions, and spectral sensitivity from 1 to beyond 12 µm using cooled detectors.

SUMMARY OF THE INVENTION

Accordingly, an object of the present invention is to provide a portable, high-performance infrared spectrograph to facilitate the detection of trace amounts of potential biohazards that exhibit characteristic infrared absorption peaks within various medium including water, air and food samples.

Another object of the present invention is to provide a compact, lightweight, high performance infrared spectrograph for space exploration to significantly reduce the cost of space missions employing infrared spectroscopy.

According to a first broad aspect of the present invention, there is provided a spectrometer comprising: a slab waveguide structure having a front input face, a rear concave face, and an output face, the front input face and output face lying over a desired output spectral range to provide an output focal point at a desired distance outside the output face; a diffraction grating provided on the rear concave face for diffracting the optical signal and directing spectral components onto the output face; a detector array; and a mounting to connect the detector array to the slab waveguide in the fixed position from the output face such that the detector array is aligned at a fixed position from the output face with respect to an output focal plane over the desired output spectral range for detecting the spectral components.

Preferably, the detector array is cooled, the output focal plane is linear, and the mounting comprises a pair of pins and mating sockets. The pins are affixed to the detector and the sockets are affixed to the slab waveguide structure. The pins are inserted into the sockets and adjusted with a submicron precision in three dimensions with respect to the slab waveguide structure. The pins are then cemented into the sockets to provide a robust and stable monolithic integration.

Also preferably, the spectrometer comprises an input aperture provided on the front input face for receiving the optical signal. The input aperture may be an array of input apertures and they may be programmable. A programmable optical chopper may also be present in front of the input aperture and synchronized with the detector array.

According to a second broad aspect of the present invention, there is provided a method for manufacturing an infrared spectrometer, the method comprising: providing a slab waveguide structure having a front input face, a rear concave face, and an output face, the front input face and output face lying over a desired output spectral range to provide an output focal point at a desired distance outside the output face and on an output focal plane; providing a diffraction grating on the rear concave face for diffracting an optical signal and directing spectral components onto the output face; and mounting a detector array at a fixed distance from the output face and on the output focal plane to monolithically integrate the detector array with the slab waveguide structure.

Preferably, mounting the detector array comprises mounting a cooled detector array using a pair of pins and mating sockets. The pins may be affixed to the detector while the sockets may be affixed to the waveguide structure. Alternatively, the pins may be affixed to the waveguide structure and the sockets may be affixed to the detector. The pins are inserted into the sockets and the detector array is positioned in three dimensions with respect to the waveguide structure. The pins are then cemented into the sockets to provide a robust and monolithic integration.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 2:
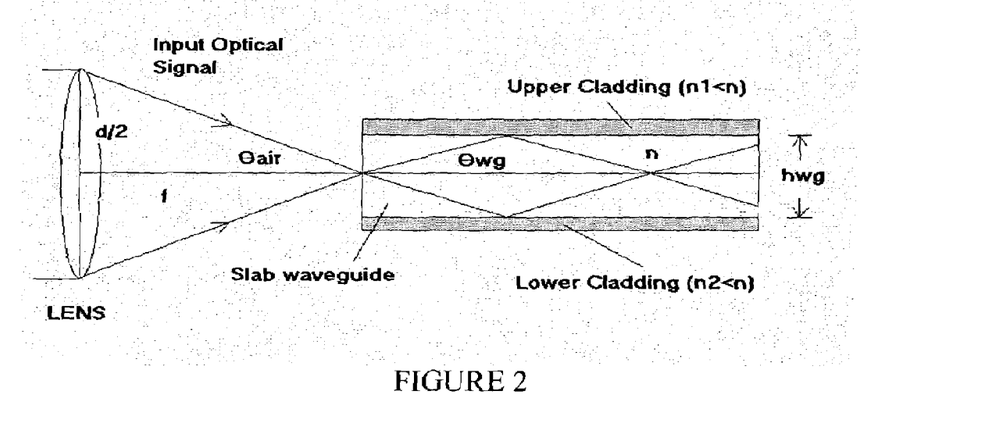
FIG. 2 is a schematic of optical coupling into a slab waveguide structure.

A desired optical signal is typically coupled into a waveguide by focusing the optical signal onto the core of the waveguide, as shown schematically in FIG. 2. This can be performed using either refractive or reflective optics. The focal length of the focusing optics is usually matched to the acceptance numerical aperture (NA) of the spectrometer:

$$NA = f/2d = n_{WG} \sin(\Theta_{WG}) = \sin(\Theta_{air});$$

where f is the focal length, d is the diameter of the desired input optical signal, $n_{WG}$ is the refractive index of the waveguide core, $\Theta_{WG}$ is the maximum angle of propagation of the optical signal within the waveguide; $\Theta_{air}$ is the corresponding maximum divergence angle of the output signal in air. For typical spectrometers, NA~0.2 to 0.25. For good coupling efficiency, the thickness of the waveguide core should be comparable to the diameter of the attainable focal spot. This is typically much larger for the non-ideal extended broadband optical sources typically employed for spectroscopy than the laser illumination sources employed in optical telecommunications. Typical spot diameters can vary from about 0.5 mm for optical arc sources such as Xe lamps to more than 5 mm for the collection and use of ambient illumination, as is employed for remote sensing applications. Therefore, a methodology for the fabrication of high-performance waveguide spectrometers that can provide a core thickness, $h_{wg}$, of several mm's is desirable for good input optical coupling.

Figure 3:
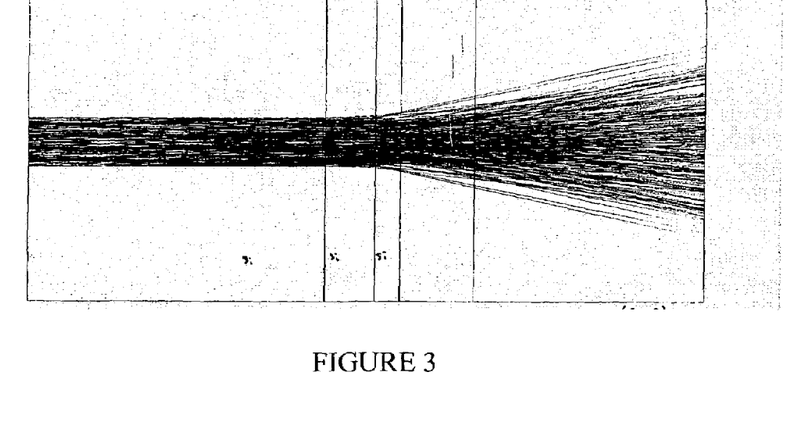
FIG. 3 illustrates divergence of an optical signal.

As the optical signal emerges from the output portion of a slab waveguide into air, it diverges in the vertical direction according to Snell's law of refraction, as shown by the Zeemax ray traces in FIG. 3 for NA=0.25. The amount of divergence depends on the numerical aperture (NA) of the input optical signal. If the waveguide is non-ideal such that there is substantial scattering of the optical signal within the waveguide, the effective NA can increase relative to the original input NA. Precise control of the output focal length in the horizontal direction is also required. Using a conventional slab waveguide structure, therefore, results in considerable loss of the output optical signal if the detector array is located some distance from the output face of the waveguide. This produces a considerable challenge in the coupling of the output of slab waveguide spectrometers to cooled detector arrays. The cooled detector must be vacuum or hermetically sealed, resulting in additional separation required between the output portion of the slab waveguide and the detector array to accommodate an additional window and provide thermal isolation.

Figure 4:
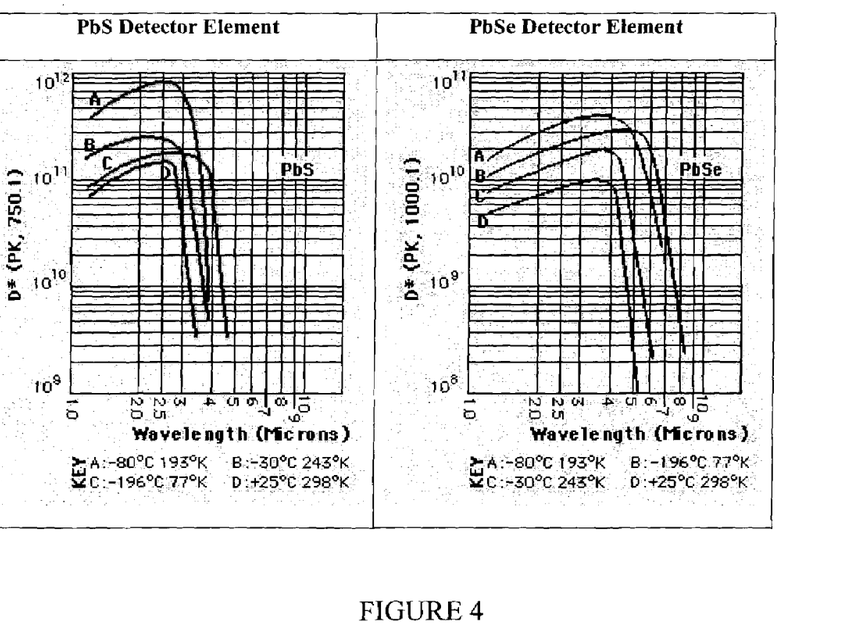
FIG. 4 shows detectivity of PbS and PbSe photo detectors versus wavelength for different operating temperatures.

The performance (detectivity, spectral range) of typical infrared detectors such as PbS, PbSe and HgCdTe (MCT) increases substantially with cooling, as evidenced by the following data, as shown in FIG. 4, taken from a typical manufacturer of PbS and PbSe detectors.

The detector detectivity, or its ability to differentiate a desired optical signal from background noise is measured in terms of the specific detectivity D*. This is related to the noise-equivalent-power (NEP) of the detector by $$NEP = SQRT(A_{det} \cdot BW)/D^*(T),$$

where $A_{det} = w_{det} \cdot h_{det}$ and $w_{det}$ is the width of the detector element, $h_{det}$ is the corresponding height of the detector element and BW is the bandwidth of the signal. The NEP represents the optical power required by an individual element of the detector array for a signal-to-noise ratio (SNR) of one. This excludes the additional noise contribution of any electronics in the processing chain between the detector element and the data acquisition system (A/D). It is desirable to have $A_{det}$ and BW as small as possible and D*(T) as large as possible in order to minimize the NEP, and hence, to maximize the signal detectivity of the system. Typically, the height of the detector elements, $h_{det}$, is constrained to be approximately equal to the thickness of the slab waveguide to ensure that all of the optical signal at the output of the slab waveguide is transferred to the detector elements.

Figure 5:
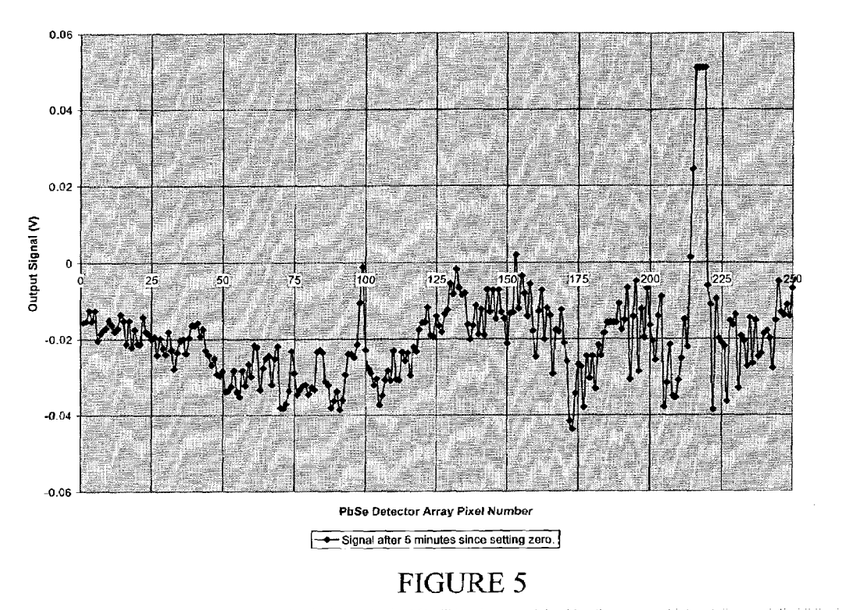
FIG. 5 is a graph of measured drift in the background of a signal.

The attainable detectivity of an infrared detector array can be significantly less than that indicated by its NEP rating due to intrinsic and extrinsic non-idealities. Even with cooling and nominal temperature stabilization, infrared detector arrays operating at longer optical wavelengths, such as PbSe, can exhibit some unwanted signal drift and instability that can be comparable to the desired signal in magnitude for lower illumination levels. FIG. 5 shows the measured drift in the signal of a commercially available 256 channel PbSe detector array in a 5 minute span after a 60 minute warm-up, with the detector array temperature-stabilized at 260K using a PI temperature controller rated for +/−0.002K. The detector signal from all the pixels was offset to an initial value of 0 V at t=0 minutes.

Even slight variations in the temperature of the detector element, of the order of 0.002K, can result in detector signal variations that are comparable to the desired signal. This is partly due to intrinsic effects in the detector material itself and partly due to the extrinsic non-idealities and influence of the additional multiplexing electronics required by detector arrays. In the typical, large table-top spectrometers, intrinsic effects are remedied by the use of a rotating mechanical chopper to modulate the optical signal intensity at a favorable frequency. The single element photo-detector employed by these systems then converts this modulated optical signal into a sinusoidally varying electronic signal. This desired signal is then differentiated from unwanted noise using complex and expensive narrow band-pass filtering and signal lock-in techniques. This allows the large table-top spectrometers to provide signal detector performance approaching theoretical limits. The prior art miniature infrared spectrometers employing multiplexed linear detectors arrays are at a significant disadvantage to the large table-top instruments in terms of the noise performance of their detector elements. Prior experience with commercially available PbSe detector arrays indicates that their attainable noise performance can be an order of magnitude greater than the theoretical NEP of an individual element.

Figure 6:
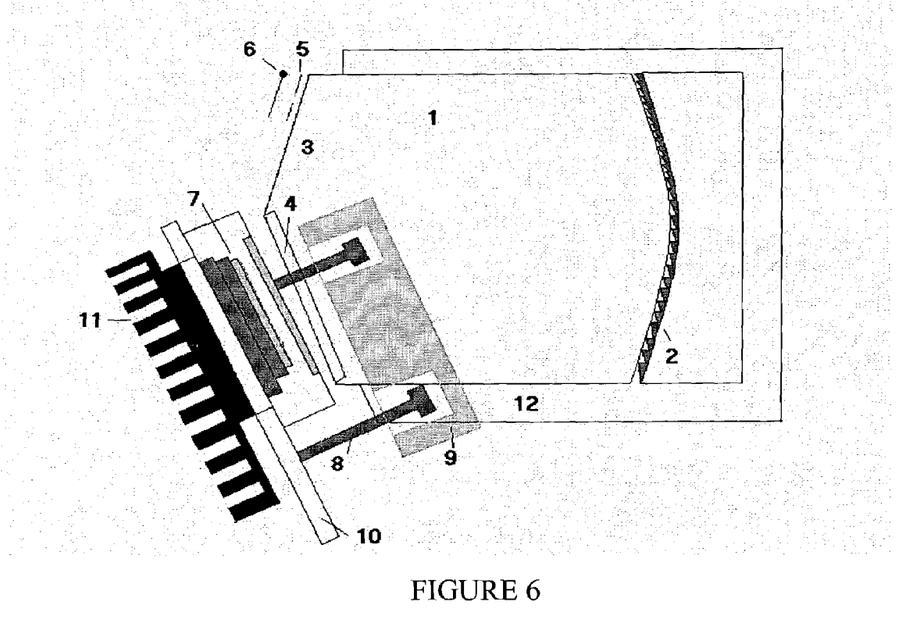
FIG. 6 is preferred embodiment of the spectrometer.

The preferred embodiment of the spectrometer, as seen in FIG. 6, employs a special infrared waveguide structure 1 in which thin-film upper and lower cladding layers are disposed on an IR transmissive core layer using standard vacuum deposition techniques. The starting substrate, with IR transparency over the desired spectral range, functions as the core of the slab waveguide structure. Upper and lower cladding layers are deposited onto the thick core layer using standard thin-film vacuum deposition techniques. These form an integral part of the slab waveguide structure. The thickness of the core layer can be selected to provide optimum performance for a selected, or range of selected, applications. For a silicon core, either metallic cladding layers that function as internal mirrors, or a Si1-xCx alloy with a refractive index smaller than that of Si, are two potential implementations of this invention. The purpose of the upper and lower cladding layers is to control the NA of the waveguide to reduce the effect of any scattered light within the waveguide on the desired output optical signal; to prevent unwanted external stray light from entering the waveguide; and to prevent the surrounding medium from affecting the desired optical signal within the waveguide. This represents a substantial improvement over prior art slab waveguide spectrometers that employ bare slabs of silicon that are subject to unwanted effects by the surrounding medium.

Alternatively, typical techniques of preparing waveguide structures, such as disposing core and cladding layers onto a substrate, may be used.

The diffraction grating 2 can be disposed directly on the waveguide structure by micromachining techniques. An alternative method is to manufacture the grating elements separately in a thin crystalline material such as Si using standard Si processing technology. This can yield very high quality gratings with measured peak diffraction efficiencies approaching theoretical limits (85 to 90%) and low scattering of the optical signal. Several gratings can be manufactured on a single Si wafer sing batch processing, substantially reducing the cost of the individual gratings. The processed wafers are diced to provide the individual gratings. The gratings are subsequently coated with gold and affixed to the concave end of the waveguide structure. This methodology provides diffraction gratings in batch production at a low cost but with performance that approaches theoretical limits in diffraction efficiency and has no physical limitations on the height of the grating. This facilitates miniature waveguide spectrometers with relatively large input apertures relative to prior art. The grating does not require any special chirp, resulting in substantially relaxed tolerances for manufacturing than chirped gratings.

Figure 7:
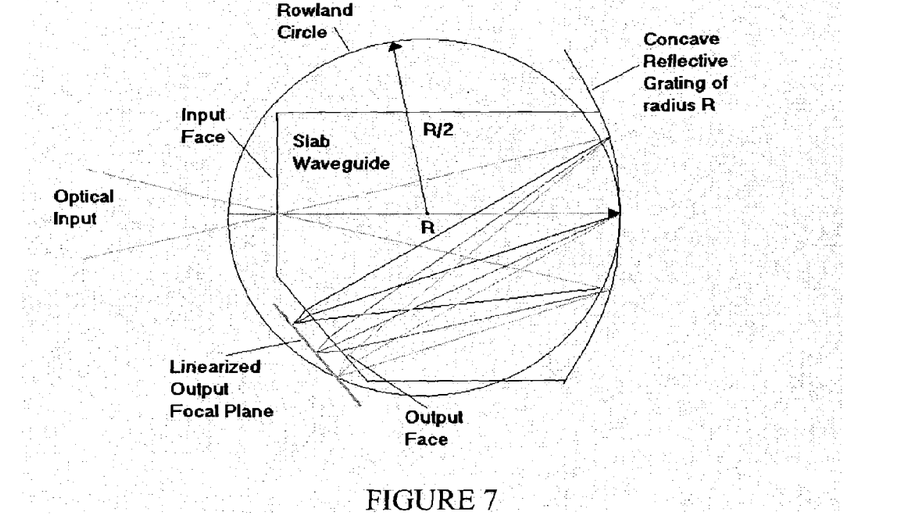
FIG. 7 is a schematic of a new optical geometry.

The spectrometer employs the input 3 and output 4 faces of the waveguide structure as active optical elements in directing and tailoring the characteristics of the desired optical signal. This employs the refractive index difference between the waveguide and the surrounding medium to assist the shaping of the desired optical signal. In the well-documented Rowland geometry employed by prior art, the output focal plane lies along a curve (Rowland Circle), as previously discussed and shown in FIG. 3. This makes the geometry unsuitable for coupling to a linear detector array without considerable effort. In this case, an approach is used in which the input and output faces of the spectrometer lie within the Rowland circle, as shown in FIG. 7. This provides a number of significant advantages. Firstly, by adjusting the spectrometer length relative to the grating radius of curvature R, the output focal length of the dispersed optical signal in the horizontal plane of the waveguide can be tailored to accommodate the spacing required by various cooled detector arrays. This uniquely employs the optical refractive capabilities provided by using a slab waveguide structure with a refractive index different from that of the surrounding medium, typically air.

The output face 4 of the waveguide structure serves as an integrated optical element to linearize the focal plane outside the slab waveguide, This is accomplished using optical refractive effects that are well known to those skilled in the art of lens making. This is applied uniquely to an optical signal confined within a solid waveguide rather than free space. Using standard optical design methods and the additional capabilities afforded by the waveguide structure, linear output focal planes over relatively broad spectral spans can be achieved.

Using the described spectrometer, operating spectral spans of 2000 nm to 4000 nm have been achieved for a single miniature spectrometer. Still broader operating spectral ranges are possible with further refinements to the design. A further benefit of this design is that a complex chirped grating is not required to obtain a linear output focal plane.

Figure 8:
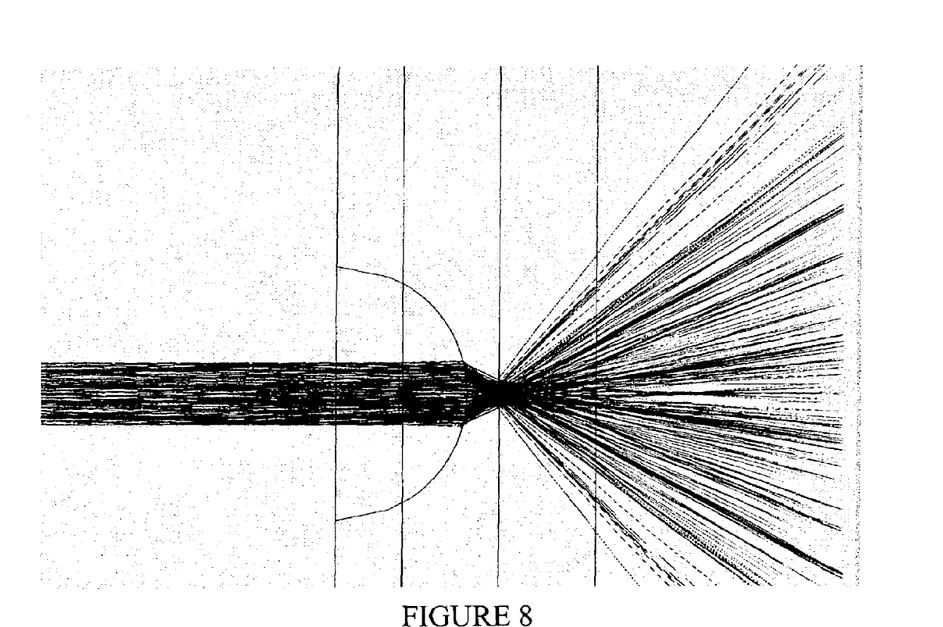
FIG. 8 is a Zeemax ray trace of output focusing of a signal.

A curvature is disposed in the vertical direction of the output plane 4 using optical polishing techniques. This curvature, as shown by the Zeemax ray trace in FIG. 8, provides focusing of the desired optical signal in the vertical direction at the output plane of the integrated spectrograph. This allows the detector array to be positioned at a further distance from the slab waveguide spectrograph than prior art. This enables additional windows and filters to be positioned between the slab waveguide structure and the detector array, providing efficient optical coupling to cooled detector arrays. A further benefit of this remedy is that the height of the detector elements or pixels can be selected to be significantly smaller than the thickness of the core of the slab waveguide structure. This reduces the effective noise-equivalent-power of the detector array and increases the typical signal responsivity of the detector array relative to prior art. The effective amplification of the desired optical signal onto the detector array by the invention significantly improves the attainable signal-to-noise ratio of the waveguide spectrograph relative to prior art by a factor of 3 or more.

An input aperture 5 is disposed of onto the input face 3 of the slab waveguide. The desired input signal is typically focused onto the aperture. The desired optical signal can also be introduced into the spectrograph by aligning and coupling a suitable input fiber, or array of fibers with respect to the input aperture. The input aperture can be directly applied to the input face by vacuum evaporating a suitable optically opaque material such as Al, and masking the desired portion of the input face to provide a window for injecting the desired optical signal into the spectrometer. Alternatively, the input aperture can be mechanically affixed to the slab waveguide structure to enable the mechanical or electronic interchange of input apertures of different sizes. The purpose of the input aperture is to define the optical input and to control the spectral resolution of the miniature spectrometer. The width of the input aperture in the horizontal direction affects the operating resolution of the spectrometer system. Reducing the input slit width provides higher spectral resolution, up to the intrinsic spectral resolution capabilities of the waveguide spectrometer itself. This is well known to those skilled in the art. However, this also reduces the input luminosity of the spectrometer, and hence, the achievable signal-to-noise ratio (SNR). In some spectral measurement tasks, it is desirable to increase the attainable SNR by the use of a wider input slit at the expense of somewhat lower spectral resolution.

A programmable optical shutter/chopper 6 is disposed between the spectrometer input face and the desired optical signal. This is employed with additional control electronics and data processing software. The shutter can be remotely opened and closed using a suitable control signal to either pass or interrupt the desired optical signal. This enables the differentiation of the desired optical signal from unwanted noise in the spectrometer system. This can significantly remedy many of the deficiencies, drift and nonidealities exhibited by typical infrared detector arrays. Infrared detectors particularly materials such as PbSe can exhibit significant instabilities and corresponding undesirable drift in the detector signal, even with temperature stabilization of the detector array. Moreover, linear detector arrays employ additional signal multiplexing that can substantially increase their noise relative to unmultiplexed detectors. Typical table-top spectrographs employ a rotating optical chopper and signal lock-in processing electronics to significantly extend the SNR of single element detectors. However, extending this methodology to a multiplexed detector array is not readily apparent.

The preferred embodiment employs a programmable shutter that is operated in synchronization with a detector array. The detector array measures alternatively the illuminated ($V_{ill}$) and the dark signal ($V_{dark}$) as obtained by opening and closing the programmable shutter. The relative rate of measuring the dark and illuminated signals can be adjusted by the user. This is synchronized with the acquisition of the data from the detector array. The typical measured detector signal $V_{meas}$ actually consists of the desired optical signal as converted to electronic form by the detector array ($V_{des}$) and the unwanted background signal $V_{dark}$ that includes the detector dark signal, detector intrinsic noise, and electronic noise inherent in the signal path between the detector and the data acquisition system (multiplexer nonidealities, amplifier noise):

$$V_{meas(i)} = V_{des(i)} + V_{dark(i)}$$

Figure 10:
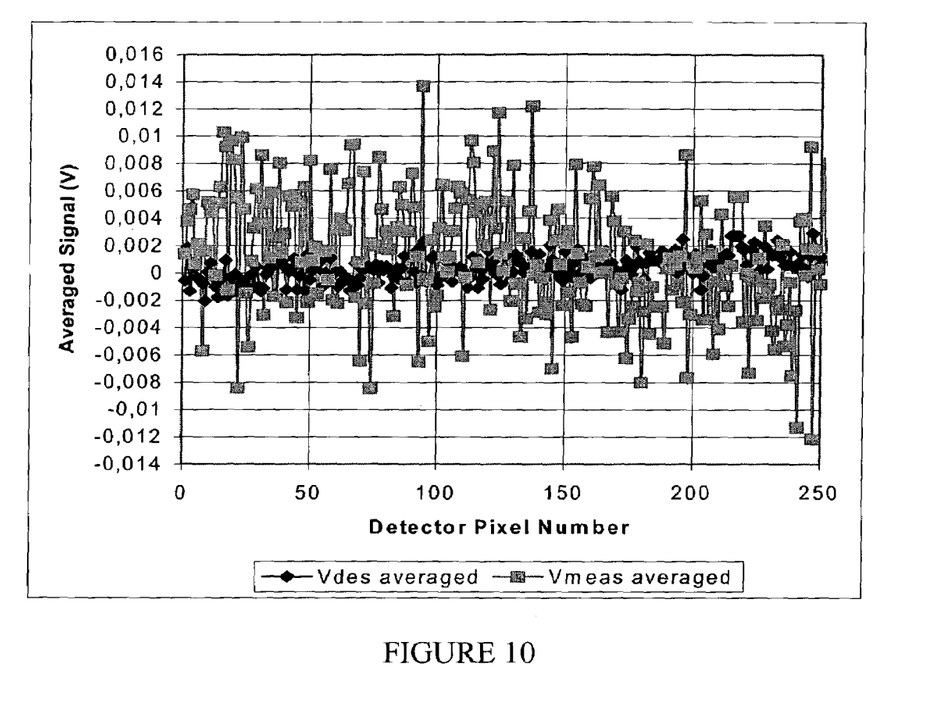
FIG. 10 is a graph showing a comparison of typical PbSe detector pixel noise with the detector held at 260 K after averaging 100 scans using traditional averaging (Vmeas (avg)) and the new methodology (Vdes(avg))

It should be noted that the unwanted signal, $V_{dark}$, contains both statistically randomly varying noise components and nonrandom pixel signal drift. In the preferred embodiment, a programmable optical chopper 6 is combined with the spectrometer 1 and a linear detector array 7 to yield a high-performance miniature infrared spectral measurement system. By averaging $V_{des(i)}$, as obtained from alternating measurements of $V_{ill(i)}$ and $V_{dark(i)}$, a substantial improvement in the net SNR can be obtained of more than an order of magnitude relative to the prior art of averaging $V_{meas}$. This is due to the instantaneous tracking of the detector dark signal nonidealities and drift, through continuous measurement of the dark signal, $V_{dark}$, and the elimination of any stray light effects by coding the desired optical signal. This eliminates the effects of nonrandom drifts in the detector signal during averaging. The signals from the various channels of the detector array are processed and averaged in parallel, providing parallel multi-channel operation. A noise level below +/−0.2 mV has been achieved (as shown in FIG. 10) for 256 channel PbSe detector arrays using 500 scan pairs relative to a full scale signal of 5V, yielding a signal to noise ratio of 25,000 with a low-cost 12 bit data acquisition card. The methodology can be generically employed for the signal processing of various detector arrays. A further benefit of this invention is that it eliminates the need for expensive signal lock-in electronics and complex data processing.

Figure 11:
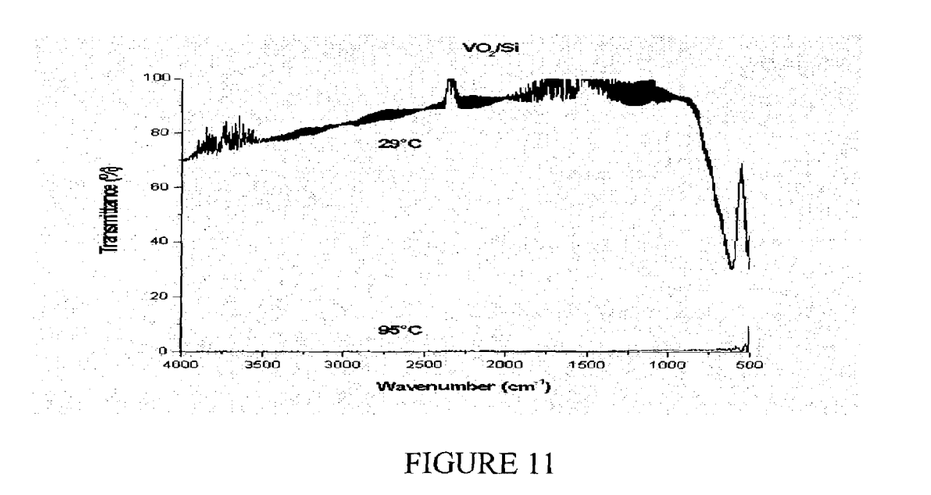
FIG. 11 is a graph showing optical transmittance of $VO_2$ on Si prepared by vacuum deposition in the insulating (29° C.) and metallic (95° C.) states.

In an additional feature of the present embodiment, the input aperture window contains a thin-film electro-chromic or thermo-chromic shutter, such as an alloy based on $VO_2$. This provides an integrated thin-film programmable shutter (window) that can be switched over a broad spectral range from transparent to opaque using a control signal, such as an applied voltage or temperature, with the added benefit of no moving mechanical components. The electro-chromic or thermo-chromic material can be disposed onto the input slit using vacuum deposition techniques. The thermo-chromic or electro-chromic material can also be disposed by other techniques employed by those skilled in the deposition of coatings such as spun on from a suitable liquid solution. Optically active alloys based on $VO_2$ in particular can provide optical chopping or modulation over a broad spectral range as shown in FIG. 11. This provides a programmable shutter that can be employed to chop or modulate the desired input signal to the integrated spectrograph with no moving components.

Alternatively, the input slit 5 and programmable shutter 6 are replaced by an array of N programmable shutters, each one slit wide, that can be controlled individually to either pass the desired optical signal or interrupt it. The programmable slit array could be miniature MEMS devices. However, the preferably implementation is through the patterning of electro-chromic or thermo-chromic thin films. This can provide higher reliability due to no moving components. The programmable input slit array increases the input luminosity by a factor of N/2 relative to single slit spectrometers. The slits can be programmed to code the optical signal using various on/off sequences for the individual shutters. One potential code is known as the Hadamard transform. It employs a simple binary inverse transform to provide the desired signal. Other codes may also be feasible to one skilled in the art.

The waveguide output face 4 is aligned and coupled to a linear detector array 7 at the output focal plane. The detector array affixed to a mechanical support 10. The support 10 also provides mounting for a heat sink 11 and additional electronics associated with multiplexing, amplifying and processing the detector array signals. The invention provides for increased separation between the output face 4 and the detector array 7 to enable integration with various cooled detector arrays.

The invention provides for very robust and stable integration of the various optical and electro-optical components comprising the high-performance spectrometer system. The spectrometer is epoxied onto a support base 12. A series of pins 8 and mating sockets 9 are employed to monolithically integrate the detector array 7 with the slab waveguide spectrometer. The pins can be affixed to the spectrometer base 12 or the detector support 10. The mating sockets are affixed to the opposite piece. The pins insert into the sockets with some leeway for positional adjustment. The pins and sockets enable sub micron precision in positioning and aligning the detector array in three dimensions with respect to the spectrometer. A low thermal-expansion potting compound is applied to the sockets 9. This is employed to cement the detector array to the spectrometer in a monolithic fashion with both precision and great mechanical strength. This remedies the previous problems with stable and robust integration of detector arrays with miniature spectrometers. The pins 8 and sockets9 can be demountable from their respective carriers to enable rework or repair of desired components.

Figure 9:
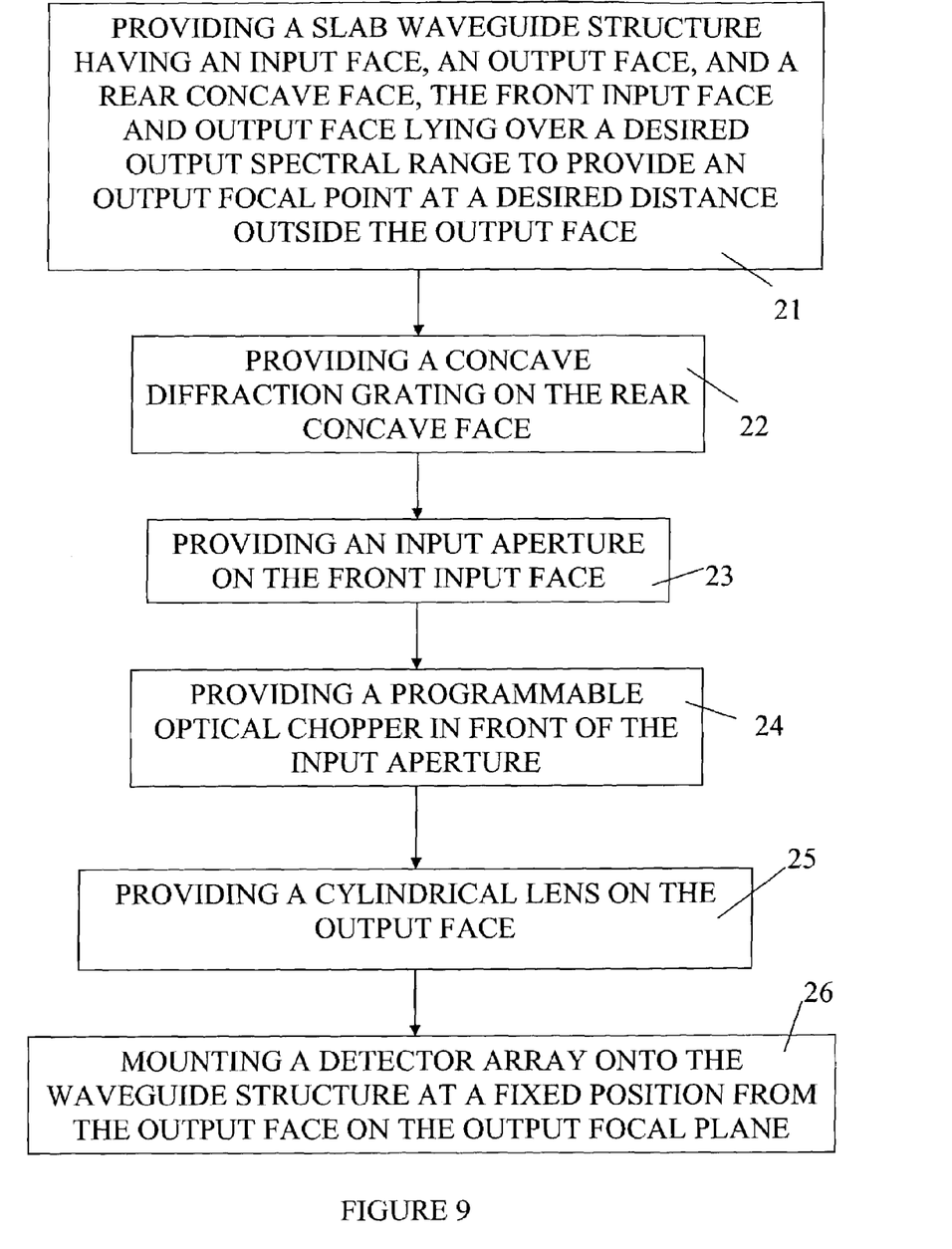
FIG. 9 is a flow chart of the method in accordance with the invention.

FIG. 9 is a flow chart in accordance with the present invention. The first step is to provide a slab waveguide structure having an input face, an output face, and a rear concave face 21. The front input face and output face lie over a desired output spectral range to provide an output focal point at a desired distance outside the output face. That is to say, they lie inside the typical Rowland circle geometry, as shown in FIG. 1. A concave diffraction grating is provided on the rear concave face of the slab waveguide structure 22. Optionally, several features may also be present in the spectrometer. An input aperture may be provided on the front input face 23. A programmable optical chopper may be placed in front of the input aperture 24. Additionally, a cylindrical lens may be placed on the output face 25 in order to better focus the focal point on the focal plane. Finally, a cooled detector array is mounted on the focal plane at a fixed distance from the output face 26. The mounting of the detector array may comprise using a pair of pins and sockets, the pins being affixed to the detector and the sockets to the waveguide structure, or vice versa. The pins are inserted into the sockets and a submicron precision is provided in three dimensions in order to properly align the detector with respect to the slab waveguide structure. Once the position is chosen, the pins are cemented into the sockets to provide a robust monolithic integration.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A spectrometer comprising:
    a slab waveguide structure having a core of thickness greater than about 0.5 mm, a front input face for receiving an optical signal, a rear concave face, and an output face, the front input face and output face lying over a desired output spectral range to provide an output focal point at a desired distance outside said output face;
    a diffraction grating provided on said rear concave face for diffracting said optical signal and directing spectral components onto said output face;
    a detector array; and
    a mounting to connect said detector array to said slab waveguide at said output face such that said detector array is aligned at a fixed position from said output face with respect to an output focal plane over said desired output spectral range for detecting said spectral components.

2. A spectrometer as claimed in claim 1, wherein said detector array is a cooled detector array.

3. A spectrometer as claimed in claim 1, wherein said detector array is placed on said output focal plane.

4. A spectrometer as claimed in claim 3, wherein an output focal spot of said spectrometer is coincident with a receiving detector pixel of said detector array.

5. A spectrometer as claimed in claim 1, wherein said output focal plane is linearized.

6. A spectrometer as claimed in claim 1, wherein said diffraction grating is linear.

7. A spectrometer comprising:
    a slab waveguide structure having a front input face for receiving an optical signal, a rear concave face, and an output face, the front input face and output face lying over a desired output spectral range to provide an output focal point at a desired distance outside said output face;
    an array of apertures disposed on said front input face for receiving an optical signal;
    a diffraction grating provided on said rear concave face for diffracting said optical signal and directing spectral components onto said output face;
    a detector array; and
    a mounting to connect said detector array to said slab waveguide at said output face such that said detector array is aligned at a fixed position from said output face with respect to an output focal plane over said desired output spectral range for detecting said spectral components.

8. A spectrometer as claimed in claim 7, wherein said array of apertures is programmable.

9. A spectrometer as claimed in claim 1, wherein said diffraction grating is coated with gold.

10. A spectrometer as claimed in claim 1, wherein said detector array is linear.

11. A spectrometer as claimed in claim 1, wherein said slab waveguide structure is planar.

12. A spectrometer as claimed in claim 1, wherein said slab waveguide structure comprises an upper and lower cladding deposited on said core.

13. A spectrometer as claimed in claim 1, further comprising a cylindrical lens provided on said output face of said slab waveguide structure to focus an output signal comprising said spectral components in a vertical plane onto said detector array.

14. A spectrometer as claimed in claim 12, wherein said core is based on one of the following materials: AMTIR, sapphire, ZnS, ZnSe, Si, and Ge.

15. A spectrometer as claimed in claim 12, wherein said upper and lower cladding is a metallic, reflective upper and lower cladding.

16. A spectrometer as claimed in claim 12, wherein said upper and lower cladding is a dielectric cladding with a refractive index lower than a refractive index of said core.

17. A spectrometer comprising:
a slab waveguide structure having a front input face for receiving an optical signal, a rear concave face, and an output face, the front input face and output face lying over a desired output spectral range to provide an output focal point at a desired distance outside said output face;
at least one input aperture provided on said front input face for receiving an optical signal;
a diffraction grating provided on said rear concave face for diffracting said optical signal and directing spectral components onto said output face;
a detector array;
a mounting to connect said detector away to said slab waveguide at said output face such that said detector array is aligned at a fixed position from said output face with respect to an output focal plane over said desired output spectral range for detecting said spectral components; and
a programmable optical chopper positioned in front of said input aperture and synchronized with said detector.

18. A spectrometer comprising:
a slab waveguide structure having a front input face for receiving an optical signal, a rear concave face, and an output face, the front input face and output face lying over a desired output spectral range to provide an output focal point at a desired distance outside said output face;
a diffraction grating provided on said rear concave face for diffracting said optical signal and directing spectral components onto said output face;
a detector array; and
at least one pair of pins and mating sockets for monolithically integrating said detector array into said slab waveguide structure at said output face such that said detector array is aligned at a fixed position from said output face with respect to an output focal plane over said desired output spectral range for detecting said spectral components.

19. A spectrometer as claimed in claim 18, wherein said pins insert into said sockets with some leeway for positional adjustment and enable positioning said detector array in three dimensions with respect to said slab waveguide structure.

20. A spectrometer as claimed in claim 19, wherein said pins are affixed to said detector array and said mating sockets are affixed to said slab waveguide structure.

21. A spectrometer as claimed in claim 19, wherein said pins are cemented into said sockets once said detector array is aligned with said slab wave guide structure.

22. A spectrometer as claimed in claim 19, wherein said pins and sockets are demountable to enable rework or repair.

23. A method for manufacturing an infrared spectrometer, the method comprising:
providing a slab waveguide core having a front input face, a rear concave face, and an output face, the front input face and output face lying over a desired output spectral range to provide an output focal point at a desired distance outside said output face and on an output focal plane;
providing a diffraction grating on said rear concave face for diffracting an optical signal and directing spectral components onto said output face;
depositing onto an upper and a lower side of said core a cladding layer to provide a slab waveguide structure; and
mounting a detector array at a fixed distance from said output face and on said output focal plane to monolithically integrate said detector array with said slab waveguide structure.

24. A method as claimed in claim 23, wherein said mounting a detector array comprises mounting a cooled detector array.

25. A method as claimed in claim 23, wherein said mounting a detector array comprises mounting said detector array on said output focal plane.

26. A method as claimed in claim 25, wherein said mounting a detector array comprises providing an output focal spot of said spectrometer coincident with a receiving detector pixel of said detector array.

27. A method as claimed in claim 23, wherein said providing a diffraction grating comprises providing a linear diffraction grating.

28. A method for manufacturing an infrared spectrometer, the method comprising:
providing a slab waveguide structure having a front input face, a rear concave face, and an output face, the front input face and output face lying over a desired output spectral range to provide an output focal point at a desired distance outside said output face and on an output focal plane;
providing a diffraction grating on said rear concave face for diffracting an optical signal and directing spectral components onto said output face; and
mounting a detector array at a fixed distance from said output face and on said output focal plane by using at least a pair of pins and mating sockets to connect said detector array and said slab waveguide structure to monolithically integrate said detector array with said slab waveguide structure.

29. A method as claimed in claim 28, wherein said mounting comprises affixing a pair of pins to said detector array and affixing a pair of mating sockets to said slab waveguide structure.

30. A method as claimed in claim 28, wherein said mounting comprises positioning said detector array in two dimensions with respect to said slab waveguide structure.

31. A method as claimed in claim 28, wherein said mounting comprises cementing said pins inside said sockets once said detector array is in a desired position.

32. A method as claimed in claim 30, wherein said mounting comprises providing an adjustment mechanism for positioning said detector array in three dimensions with respect to said slab waveguide.

33. A method for manufacturing an infrared spectrometer, the method comprising:
providing a slab waveguide structure having a front input face, a rear concave face, and an output face, the front input face and output face lying over a desired output spectral range to provide an output focal point at a desired distance outside said output face and on an output focal plane;
providing an array of apertures on said front input face for receiving an optical signal;
providing a diffraction grating on said rear concave face for diffracting an optical signal and directing spectral components onto said output face; and
mounting a detector array at a fixed distance from said output face and on said output focal plane to monolithically integrate said detector array with said slab waveguide structure.

34. A method as claimed in claim 33, wherein said providing an array of apertures comprises providing an array of programmable apertures.

35. A method for manufacturing an infrared spectrometer, the method comprising:
providing a slab waveguide structure having a front input face, a rear concave face, and an output face, the front input face and output face lying over a desired output spectral range to provide an output focal point at a desired distance outside said output face and on an output focal plane;
providing at least one input aperture on said front input face for receiving said optical signal;
providing a diffraction grating on said rear concave face for diffracting an optical signal and directing spectral components onto said output face;
mounting a detector array at a fixed distance from said output face and on said output focal plane to monolithically integrate said detector array with said slab waveguide structure; and
providing a programmable optical chopper positioned in front of said at least one input aperture and synchronized with said detector array.

36. A method as claimed in claim 23, wherein said core has a thickness of at least about 0.5 mm.

37. A method as claimed in claim 36, further comprising providing a cylindrical lens on said output face of said slab waveguide structure to focus an output signal on said output focal plane.

38. A spectrometer as claimed in claim 1, wherein said core is an infrared transmissive core, and said spectrometer is an infrared spectrometer.

39. A spectrometer as claimed in claim 1, wherein said core has a thickness of more than 5 mm, and said spectrometer is adapted to collect and use ambient illumination.

* * * * *